(12) United States Patent
Ally et al.

(10) Patent No.: US 11,882,824 B2
(45) Date of Patent: Jan. 30, 2024

(54) CRYOGENIC VIAL SLEEVE AND RELATED SYSTEMS AND METHODS

(71) Applicant: Fisher BioServices Inc., Rockville, MD (US)

(72) Inventors: Abdul H. Ally, Gaithersburg, MD (US); Bruce Simpson, Frederick, MD (US); Scott Hixon, Rockville, MD (US)

(73) Assignee: Fisher BioServices Inc., Rockville, MD (US)

( * ) Notice: Subject to any disclaimer, the term of this patent is extended or adjusted under 35 U.S.C. 154(b) by 34 days.

(21) Appl. No.: 16/527,119

(22) Filed: Jul. 31, 2019

(65) Prior Publication Data

US 2020/0281191 A1    Sep. 10, 2020

Related U.S. Application Data

(60) Provisional application No. 62/815,590, filed on Mar. 8, 2019.

(51) Int. Cl.
| | | |
|---|---|---|
| *A01N 1/02* | (2006.01) | |
| *B01L 3/00* | (2006.01) | |
| *G01N 1/42* | (2006.01) | |

(52) U.S. Cl.
CPC ......... *A01N 1/0268* (2013.01); *A01N 1/0257* (2013.01); *B01L 3/545* (2013.01); *G01N 1/42* (2013.01)

(58) Field of Classification Search
CPC ..... A01N 1/0268; A01N 1/0257; B01L 3/545; G01N 1/42
USPC ...................................................... 435/307.1
See application file for complete search history.

(56) References Cited

U.S. PATENT DOCUMENTS

| | | | |
|---|---|---|---|
| 2,844,893 A | 7/1958 | Keller | |
| 3,285,455 A | 11/1966 | Pewitt | |
| 4,741,346 A * | 5/1988 | Wong | A61B 10/0051 600/573 |
| 5,590,782 A | 1/1997 | Haber et al. | |
| 5,711,446 A | 1/1998 | Jeffs et al. | |
| 5,894,733 A | 4/1999 | Brodner | |
| 6,337,205 B1 | 1/2002 | Wisniewski | |
| 7,832,078 B2 | 11/2010 | Thilly et al. | |

(Continued)

FOREIGN PATENT DOCUMENTS

| | | | |
|---|---|---|---|
| EP | 1489017 A1 | 12/2004 | |
| WO | WO-2017197222 A1 * | 11/2017 | ............... A61J 1/16 |
| WO | 2021096823 A1 | 5/2021 | |

OTHER PUBLICATIONS

Aseptic Technologies S.A., Brochure Vials and Lines V1.0, AT—Closed Vial® Technology, 2020 (2 pages).

*Primary Examiner* — Michael A Marcheschi
*Assistant Examiner* — Lenora A Abel
(74) *Attorney, Agent, or Firm* — Michael Best & Friedrich LLP

(57) ABSTRACT

A vial sleeve for a cryogenic vial includes a cover portion including a side wall defining a cavity for receiving at least a portion of the vial, and a locking feature configured to operatively engage at least a portion of the vial for resisting movement of the vial relative to the vial sleeve. The vial sleeve may include a first label adhered to an exterior surface of the side wall and including a first set of indicia. The first set of indicia may be different from a second set of indicia included on a second label adhered to an exterior surface of the vial.

28 Claims, 11 Drawing Sheets

(56) References Cited

U.S. PATENT DOCUMENTS

| | | | |
|---|---|---|---|
| 7,946,437 B2 * | 5/2011 | Thilly | B65D 51/002 |
| | | | 215/249 |
| 7,950,540 B2 | 5/2011 | Bara | |
| 8,002,130 B2 | 8/2011 | Thilly | |
| D656,236 S | 3/2012 | Marechal et al. | |
| 8,479,919 B2 | 7/2013 | Kaplan et al. | |
| 9,169,042 B2 | 10/2015 | Guelkner et al. | |
| 9,248,939 B2 | 2/2016 | O'Brien | |
| D778,460 S | 2/2017 | Marechal et al. | |
| 9,649,443 B2 | 5/2017 | Klintenstedt et al. | |
| 9,861,753 B2 | 1/2018 | Klintenstedt et al. | |
| D827,153 S | 8/2018 | Bantug et al. | |
| 10,206,852 B2 | 2/2019 | Larson et al. | |
| 10,245,212 B2 | 4/2019 | Larson et al. | |
| 10,525,202 B2 | 1/2020 | Klintenstedt et al. | |
| 10,653,843 B2 | 5/2020 | Klintenstedt et al. | |
| 10,745,186 B2 | 8/2020 | Ma et al. | |
| 10,988,284 B2 | 4/2021 | Bantug et al. | |
| 2007/0108205 A1 | 5/2007 | Porras | |
| 2007/0272581 A1 | 11/2007 | Guelker et al. | |
| 2010/0038273 A1 | 2/2010 | Johnson | |
| 2012/0292219 A1 | 11/2012 | Terwilliger et al. | |
| 2014/0326627 A1 | 11/2014 | Manzana | |
| 2014/0328734 A1 * | 11/2014 | Crawford | B01L 3/508 |
| | | | 422/547 |
| 2016/0175197 A1 * | 6/2016 | Larson | B65B 3/006 |
| | | | 206/459.5 |
| 2017/0361989 A1 | 12/2017 | Moffett, III | |
| 2020/0299048 A1 | 9/2020 | Santamaria | |
| 2021/0047076 A1 | 2/2021 | Chalfant et al. | |
| 2021/0094743 A1 | 4/2021 | Donschietz | |
| 2021/0106498 A1 | 4/2021 | Flores et al. | |

* cited by examiner

CRYOGENIC VIAL SLEEVE AND RELATED SYSTEMS AND METHODS

CROSS REFERENCE TO RELATED APPLICATION

This application claims the benefit of U.S. Provisional Patent Application Ser. No. 62/815,590, filed on Mar. 8, 2019, the disclosure of which is hereby incorporated by reference in its entirety.

FIELD OF THE INVENTION

This invention relates generally to cryogenic vials and, more particularly, to devices, systems, and methods for labeling or relabeling cryogenic vials.

BACKGROUND OF THE INVENTION

Various biological products, samples, or aliquots such as those containing living human cells including, for example, allogeneic and autologous biopharmaceutical products, must often be maintained at cryogenic temperatures (e.g., between −195° C. and −150° C.) or "cryopreserved" in order to maintain their integrity. Cryogenic containers or vials, such as those sold commercially by Aseptic Technologies, are typically used to store and/or transport such products in a cryogenic environment(s). Such vials may be available in a variety of sizes, such as having 1 mL, 2 mL, 6 mL, 10 mL, 20 mL, and 50 mL capacities, for example. While cryogenic vials may be provided in various sizes and configurations, a typical vial includes a hollow cylindrical body constructed of a transparent material capable of withstanding cryogenic temperatures.

In many cases, a visual inspection by a user, such as a technician, of the contents of the vial through the transparent cylindrical body may be insufficient to allow the user to identify the particular product or type of product contained in the vial. Thus, a label containing indicia indicating the particular product or type of product contained in the vial, as well as other necessary indicia, may be adhered to the exterior surface of the side wall of the cylindrical body.

Typically, a cryogenic vial is labeled at ambient temperature prior to filling the vial with the desired products at a cryogenic temperature. For example, a paper label may be printed with a set of indicia indicating the particular product or type of product to be contained in the cryogenic vial, and the label may be adhered to the vial with a pressure sensitive adhesive at ambient temperature (e.g., between 18° C. and 25° C.). After the adhesive has fully cured, the vial may be filled with the desired product in a cryogenic environment and subsequently maintained at a cryogenic temperature in a cryogenic freezer, for example.

In some cases, a cryogenic vial may be mislabeled with inaccurate indicia for the product contained therein or other incorrect indicia. In order to hypothetically adhere a new, corrected paper label over the incorrect paper label, the mislabeled vial would need to first be thawed. However, because the vial must be maintained at a cryogenic temperature to preserve the product contained therein, the vial cannot be thawed to perform such relabeling without spoiling or otherwise destroying the product itself. Thus, the vial may remain mislabeled throughout its entire useful life, such that accurately identifying the actual contents of the vial may become difficult or impossible.

Therefore, it would be desirable to provide improved devices, systems, and methods for labeling or relabeling cryogenic vials which address these and other problems associated with conventional cryogenic vials and labeling techniques.

SUMMARY

In one embodiment, a vial sleeve for a cryogenic vial includes a cover portion including a side wall defining a cavity for receiving at least a portion of the vial, and a locking feature configured to operatively engage at least a portion of the vial for resisting movement of the vial relative to the vial sleeve. The vial sleeve may further include a first label adhered to an exterior surface of the side wall and including a first set of indicia. The first set of indicia may be different from a second set of indicia included on a second label adhered to an exterior surface of the vial. In addition or alternatively, the vial sleeve may further include a window formed in the side wall of the cover portion. In one embodiment, the vial sleeve includes a base portion including a central bore configured to receive an annular projection of the vial, wherein the locking feature includes an annular detent extending radially inwardly from the central bore for frictionally engaging the annular projection of the vial. The locking feature may include a plurality of arcuate tabs extending radially inwardly from an upper portion of the side wall for confronting a portion of the vial. Alternatively, the locking feature may include an annular detent extending radially inwardly from a lower portion of the side wall for frictionally engaging a portion of the vial. In one embodiment, the vial sleeve includes a machine-readable coding configured to communicate information identifying one or more contents of the cryogenic vial to a machine.

In another embodiment, an assembly includes a cryogenic vial, and a vial sleeve including a cover portion including a side wall defining a cavity, and a locking feature. At least a portion of the vial is received by the cavity, and the locking feature operatively engages at least a portion of the vial for resisting movement of the vial relative to the vial sleeve. The assembly may further include a first label adhered to an exterior surface of the side wall and including a first set of indicia. In one embodiment, the cryogenic vial further includes a second label adhered to an exterior surface of the vial and including a second set of indicia different from the first set of indicia. In addition or alternatively, the assembly may include a window formed in the side wall of the cover portion. In one embodiment, the cryogenic vial includes an annular projection, the vial sleeve includes a base portion having a central bore receiving the annular projection, and the locking feature includes an annular detent extending radially inwardly from the central bore and frictionally engaging the annular projection.

The locking feature may include a plurality of arcuate tabs extending radially inwardly from an upper portion of the side wall and confronting a portion of the vial. Alternatively, the locking feature may include an annular detent extending radially inwardly from a lower portion of the side wall and frictionally engaging a portion of the vial. In one embodiment, the vial sleeve further includes a machine-readable coding configured to communicate information identifying one or more contents of the cryogenic vial to a machine.

In yet another embodiment, a method of labeling a cryogenic vial is provided. The method includes adhering a first label including a first set of indicia to a vial sleeve at an ambient temperature, the vial sleeve having a cover portion including a side wall defining a cavity and a locking feature. The method also includes positioning the cryogenic vial in a cryogenic environment, positioning the vial sleeve in the cryogenic environment, and inserting the cryogenic vial into the vial sleeve such that the cavity of the vial sleeve receives at least a portion of the vial and the locking feature operatively engages at least a portion of the vial for resisting movement of the vial relative to the vial sleeve. The method may further include removing the cryogenic vial from a removable base prior to inserting the cryogenic vial into the vial sleeve. In one embodiment, the cryogenic environment includes a cryocart. The first set of indicia may be different from a second set of indicia included on a second label adhered to an exterior surface of the vial.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
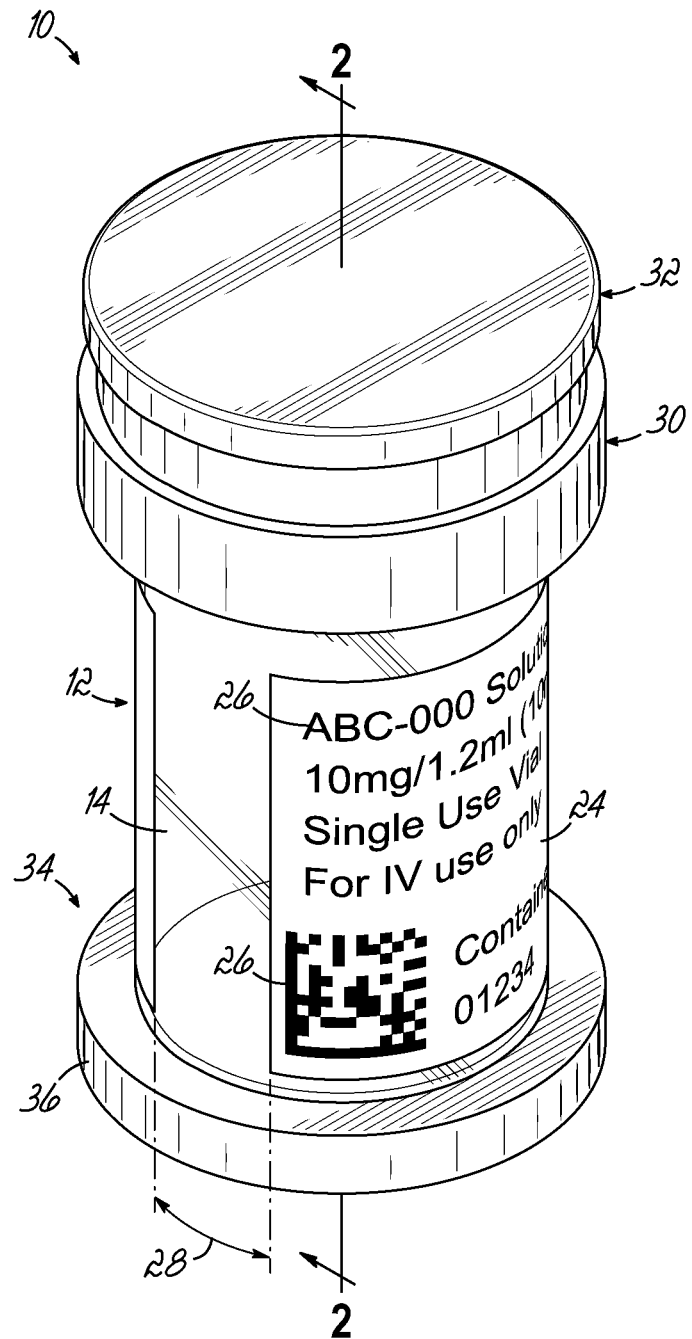
FIG. 1 is a perspective view of an exemplary cryogenic vial seated on a removable base.
Figure 2:
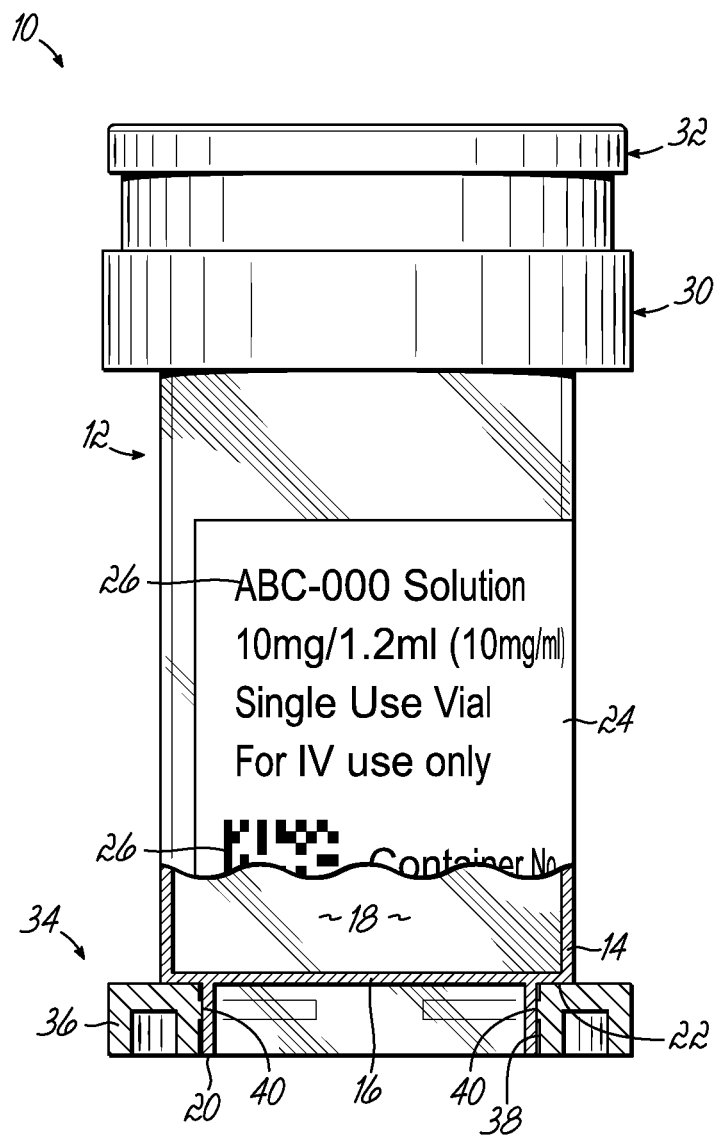
FIG. 2 is a partial cross sectional view of the cryogenic vial seated on the removable base of FIG. 1, taken along section line 2-2.
Figure 3:
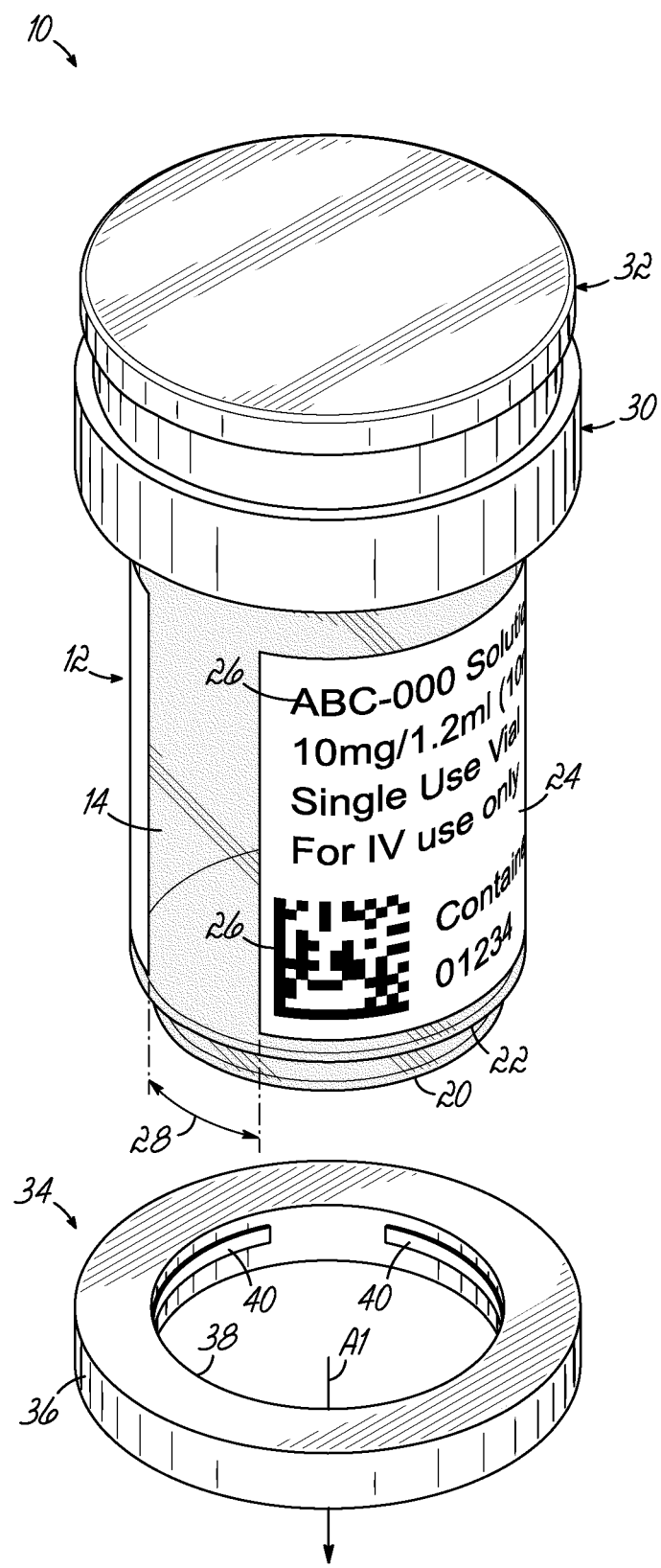
FIG. 3 is a disassembled perspective view showing the base being removed from the cryogenic vial of FIG. 1.

Referring to FIGS. 1-3, an exemplary cryogenic vial 10 includes a generally cylindrical body 12 having a side wall 14 and a bottom wall 16 collectively defining an interior space 18 for receiving the contents of the vial 10. An annular projection 20 extends from the exterior surface of the bottom wall 16 such that the portion of the bottom wall 16 radially outward of the annular projection 20 defines a ledge 22. The purposes of the annular projection 20 and the ledge 22 are described below. In any event, the cylindrical body 12 is constructed of a material capable of withstanding cryogenic temperatures. The cylindrical body 12 may also be constructed of a transparent material to allow a user to view the contents of the vial 10 in the interior space 18, such as for visually assessing a fill level of the vial 10. The material forming the cylindrical body 12 may be clear or amber-tinted, for example. In one embodiment, the cylindrical body 12 may be constructed of a plastic polymer such as cyclic olefin co-polymer (COC), for example. As described herein, the depicted exemplary vials are manufactured and sold commercially by Aseptic Technologies of Belgium.

In the embodiment shown, a first label 24 printed with a first set of indicia 26 is adhered to the exterior surface of the side wall 14 of the cylindrical body 12. The first set of indicia 26 includes user-discernable text and/or images for visually communicating to a user a certain product or type of product, as well as machine-readable coding such as a quick response (QR) code for optically communicating similar information to a machine via a reader or scanner. The first label 24 may be adhered to the exterior surface of the side wall 14 with a pressure sensitive adhesive at ambient temperature prior to filling of the vial 10 with the desired product in a cryogenic environment. As shown, the first label 24 may wrap around a substantial portion of the side wall and may leave an unobstructed longitudinal gap 28 on the exterior surface of the side wall 14 between lateral ends of the first label 24 to avoid interfering with a user's ability to visually assess a fill level of the vial 10 through the transparent material of the cylindrical body 12, for example.

The illustrated cryogenic vial also includes a closure member 30 fixed over the cylindrical body 12 opposite the bottom wall 16 for closing off the interior space 18 in a sealed manner. The closure member 30 may include a pierceable plug or stopper member (not shown) which may be constructed of thermoplastic elastomer (TPE), for example, such that a syringe may pierce the stopper member from an exterior of the vial 10 for dispensing the product into or extracting the product from the interior space 18 of the vial 10. The illustrated cryogenic vial 10 includes a cap 32 which is removably snap-fit to the closure member 30 over the stopper member to prevent inadvertent piercing of the stopper member.

As shown, the cryogenic vial 10 is seated on a removable base 34 to assist in stabilizing the vial 10 on a surface, such as a shelf-top of a cryogenic freezer, and thereby prevent the vial 10 from inadvertently toppling over. In this regard, the removable base 34 includes an annular body 36 having a central bore 38 configured to receive the annular projection 20 of the vial 10 when the ledge 22 of the vial 10 is seated on the annular body 36. A locking feature is provided on the annular body 36 including a pair of semi-annular protrusions or raised detents 40 extending radially inwardly from the central bore 38 for frictionally engaging the annular projection 20 of the vial 10. In this regard, the semi-annular detents 40 and the annular projection 20 may be relatively sized to provide an interference fit therebetween in order to assist in retaining the vial 10 on the removable base 34.

According to one aspect of the present invention, in the event the first label 24 is determined to be printed with an incorrect first set of indicia 26 for a particular vial 10, the vial 10 may be selectively separated or unseated from the removable base 34 by applying a threshold force to the removable base 34 in the direction indicated by the arrow A1 sufficient to overcome the frictional engagement between the semi-annular detents 40 and the annular projection 20 as best shown in FIG. 3.

Figure 4:
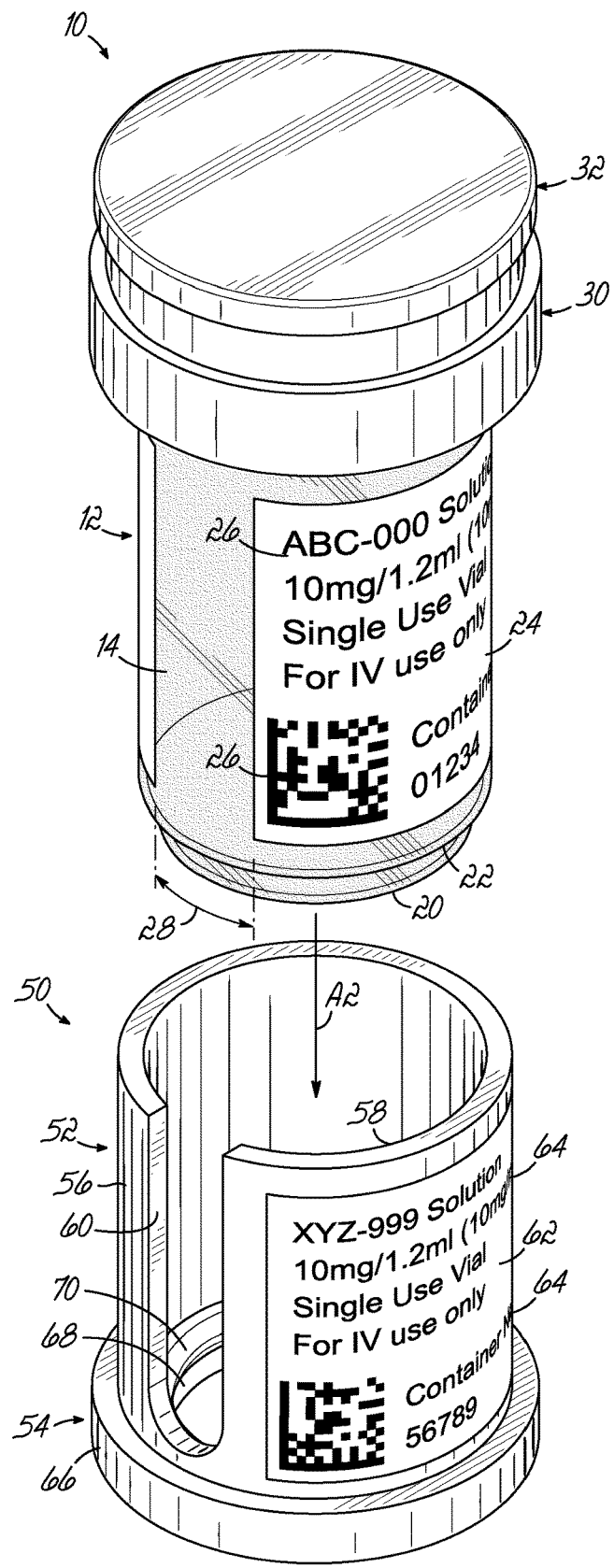
FIG. 4 is a disassembled perspective view showing the cryogenic vial of FIG. 1 being inserted into an exemplary vial sleeve in accordance with one embodiment of the present invention.
Figure 5:
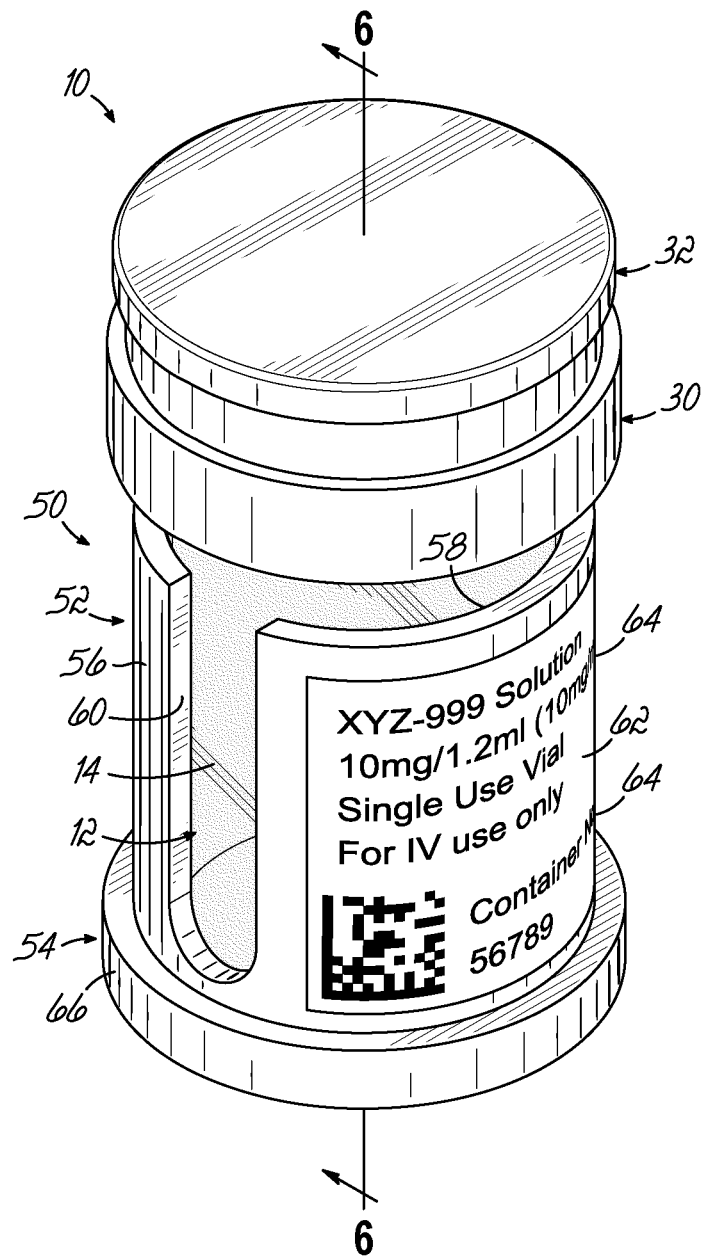
FIG. 5 is a perspective view of the cryogenic vial of FIG. 1 seated in the vial sleeve of FIG. 4.
Figure 6:
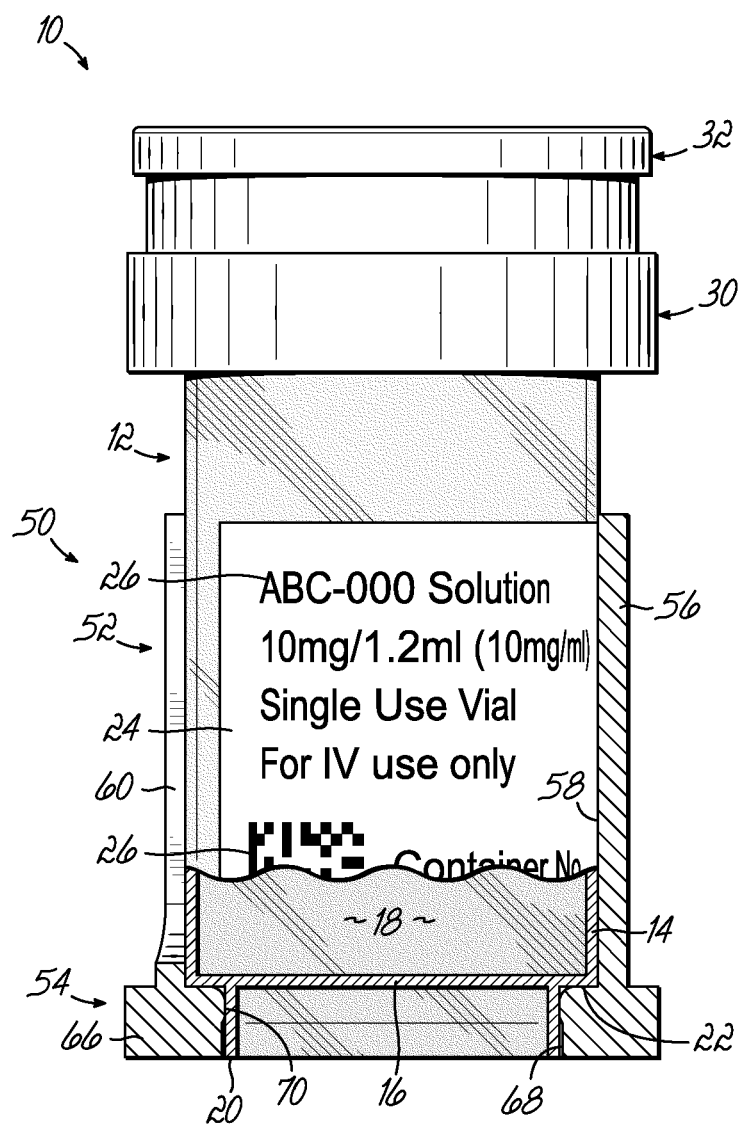
FIG. 6 is a partial cross sectional view of the cryogenic vial seated in the vial sleeve of FIG. 5, taken along section line 6-6.

Referring now to FIGS. 4-6, the vial 10 may be seated in an exemplary vial sleeve 50 according to one embodiment of the present invention, as indicated by the arrow A2 in FIG. 4.

The illustrated vial sleeve 50 includes a generally cylindrical cover portion 52 extending axially away from a generally annular base portion 54. The cylindrical cover portion 52 includes a side wall 56 defining a cavity 58 for receiving at least a portion of the cylindrical body 12 of the vial 10. The cavity 58 of the vial sleeve 50 and the cylindrical body 12 of the vial 10 may be relatively sized to provide a close fit therebetween. For example, the cavity 58 of the vial sleeve 50 and the cylindrical body 12 of the vial 10 may be relatively sized such that the exterior surface of the side wall 14 of the cylindrical body 12 may be slidable along the interior surface of the side wall 56 of the cover portion 52. In any event, the cover portion 52 is constructed of a material capable of withstanding cryogenic temperatures. The cover portion 52 may also be constructed of an opaque material to prevent a user from viewing the exterior surface of the cylindrical body 12 of the vial 10 in the cavity 58 and, more particularly, from viewing the first set of indicia 26 printed on the first label 24 adhered thereto. In one embodiment, the cover portion 52 may be constructed of a plastic polymer such as cyclic olefin co-polymer (COC), for example, and/or of a metal alloy.

The illustrated cover portion 52 includes a cutout or aperture 60 extending longitudinally along the side wall 56. The aperture 60 may overlap the unobstructed longitudinal gap 28 on the exterior surface of the cylindrical body 12 of the vial 10, such that a user may be able to visually assess a fill level of the vial 10 through the aperture 60 and the transparent material of the cylindrical body 12. In one embodiment, an alignment feature such as a raised embossment (not shown) may be provided on the exterior surface of the cylindrical body 12 of the vial along the unobstructed longitudinal gap 28 and may be sized and configured to be received by the open end of the aperture 60 and slid along the aperture 60 toward the closed end thereof when the cylindrical body 12 is inserted into the cavity 58 to assist in ensuring that the aperture 60 overlaps the unobstructed longitudinal gap 28. While the illustrated aperture 60 is open-ended, the aperture 60 may alternatively be closed-ended.

In the embodiment shown, a second label 62 printed with a correct second set of indicia 64 different from the mislabeled first set of indicia 26 is adhered to the exterior surface of the side wall 56 of the cover portion 52. The second set of indicia 64 includes user-discernable text and/or images for visually communicating to a user a certain product or type of product, as well as machine-readable coding such as a QR code for optically communicating similar information to a machine via a reader or scanner. The second label 62 may be adhered to the exterior surface of the side wall 56 with a pressure sensitive adhesive which is allowed to cure at ambient temperature prior to inserting the vial 10 into the sleeve 50 in a cryogenic environment.

The annular base portion 54 of the vial sleeve 50 includes an annular body 66 having a central bore 68 configured to receive the annular projection 20 of the vial 10 when the ledge 22 of the vial 10 is seated on the annular body 66 to assist in stabilizing the vial 10 on a surface, such as a shelf-top of a cryogenic freezer, and thereby prevent the vial 10 from inadvertently toppling over. In the embodiment shown, the cover portion 52 and the base portion 54 are integrally formed together as a unitary piece. A locking feature is provided on the annular body 66 including an annular protrusion or raised detent 70 extending radially inwardly from the central bore 68 for frictionally engaging the annular projection 20 of the vial 10. In this regard, the annular detent 70 and the annular projection 20 may be relatively sized to provide an interference fit therebetween in order to assist in retaining the vial 10 in the sleeve 50. More particularly, the annular projection 20 and the annular detent 70 may interact with each other to resist movement of the vial 10 relative to the sleeve 50 to prevent inadvertent removal of the vial 10 from the sleeve 50. As shown, the annular detent 70 is rounded to assist in insertion of the annular projection 20 into the central bore 68. For example, operative engagement of the annular projection 20 with the rounded surface of the annular detent 70 as the annular projection 20 is inserted into the central bore 68 may urge the annular detent 70 slightly radially outward to accommodate the annular projection 20.

In one embodiment, the annular detent 70 and the annular projection 20 may be relatively sized such that the interference fit provided therebetween is greater or stronger than that provided between the semi-annular detents 40 of the base 34 and the annular projection 20 of the vial 10, such that a greater threshold force may be required to remove the sleeve 50 from the vial 10 than that required to remove the base 34 from the vial 10. In other words, the sleeve 50 may be less removable from the vial 10 than the base 34. In one embodiment, the sleeve 50 may not be readily removable from the vial 10 such that the sleeve 50 may not be removed without substantially damaging the vial 10 and/or the sleeve 50, and thus may be considered irremovable. While the illustrated locking feature includes the annular detent 70, it will be appreciated that various other locking features capable of interacting with one or more features of the vial 10 to resist movement of the vial 10 relative to the sleeve 50 may be used. For example, a locking feature similar to the semi-annular detents 40 of the base 34 may be used.

Figure 7:
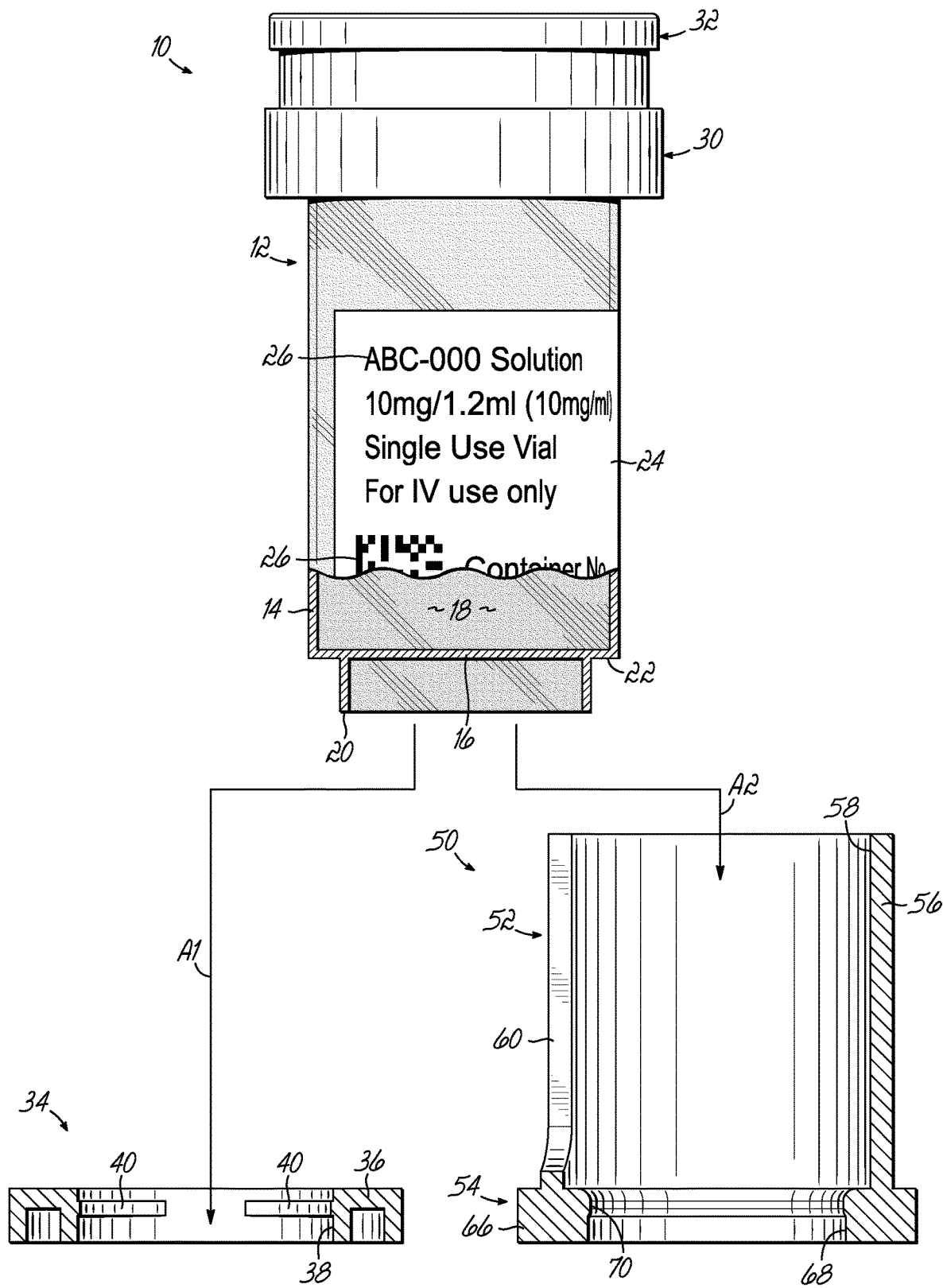
FIG. 7 is a disassembled partial cross sectional view showing the base being removed from the cryogenic vial of FIG. 1 and the cryogenic vial being inserted into the vial sleeve of FIG. 4.

Referring now to FIG. 7, a method of labeling or relabeling the cryogenic vial 10 includes removing the base 34 from the vial 10 as indicated by the arrow A1 and inserting the vial 10 into the sleeve 50 (with the second label 62 adhered thereto) as indicated by the arrow A2 until the ledge 22 of the vial 10 rests on the base portion 54 of the sleeve 50 and the annular projection 20 of the vial 10 frictionally engages the annular detent 70 of the base portion 54 to lock the vial 10 in the sleeve 50. The steps of removing the base 34 from the vial 10 and/or inserting the vial 10 into the sleeve 50 may be performed in a cryogenic environment with the vial 10 filled, in order to prevent spoilage of the contents of the vial 10. In one embodiment, one or both of these steps may be performed in a cryocart. For example, the filled vial 10 may be initially retrieved from a cryogenic freezer and placed in the cryocart, where the vial 10 may be separated from the base 34. The sleeve 50 may be introduced to the cryocart and allowed to cool to cryogenic temperature. The vial 10 may then be inserted into the sleeve 50 while in the cryocart. The vial 10 seated in the sleeve 50 may then be returned to the cryogenic freezer for continued storage, and may be readily retrieved by a user and/or machine by recognizing the second indicia 64 on the sleeve 50.

Thus, in cases where the first indicia 26 printed on the first label 24 do not properly identify the contents of the vial 10 or are otherwise inaccurate or undesirable, the vial 10 may be readily relabeled with the second indicia 64, which properly identify the contents of the vial 10 and/or provide other desirable information, via the sleeve 50 while remaining at a cryogenic temperature necessary to preserve the contents of the vial 10. Alternatively, the sleeve 50 may be used to initially label the vial 10 in cases where the vial 10 has not been previously labeled. In one embodiment, the irremovability of the sleeve 50 from the vial 10 may provide tamper evidence in the event that a user attempts to remove the vial 10 from the sleeve 50.

Figure 8:
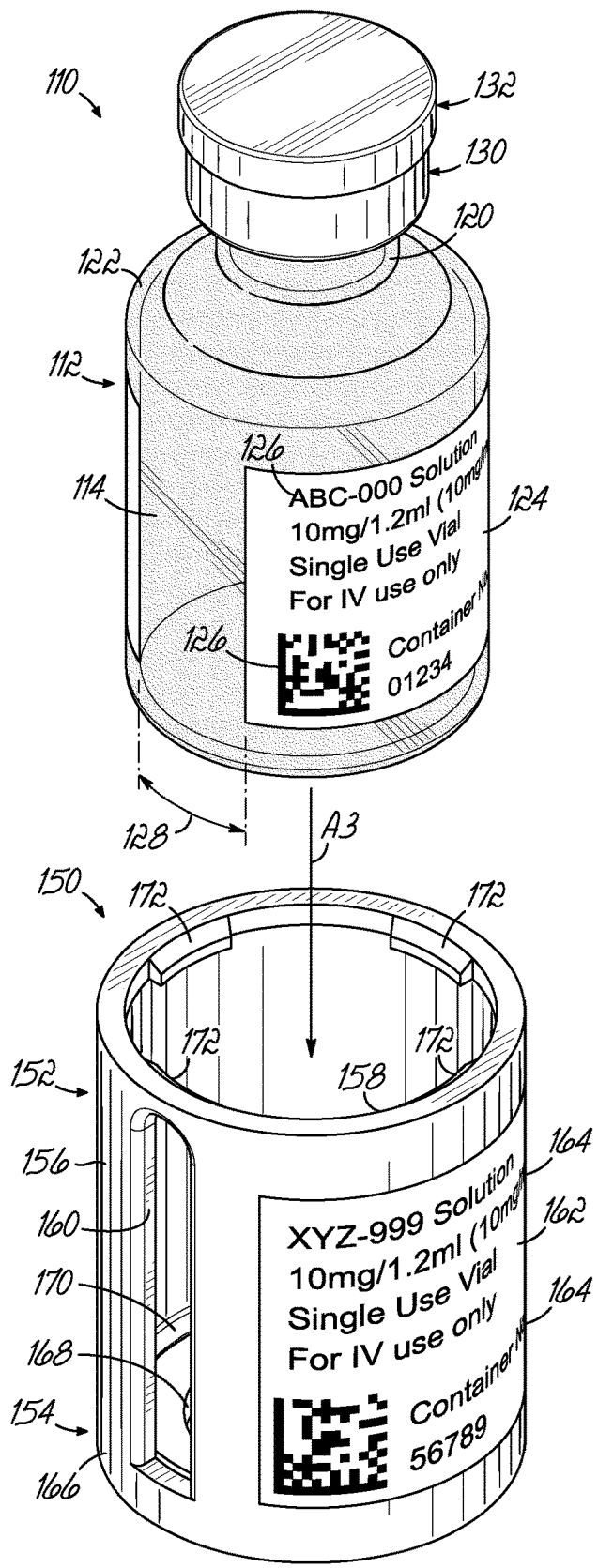
FIG. 8 is a disassembled perspective view of another exemplary cryogenic vial being inserted into another exemplary vial sleeve in accordance with another embodiment of the present invention.
Figure 9:
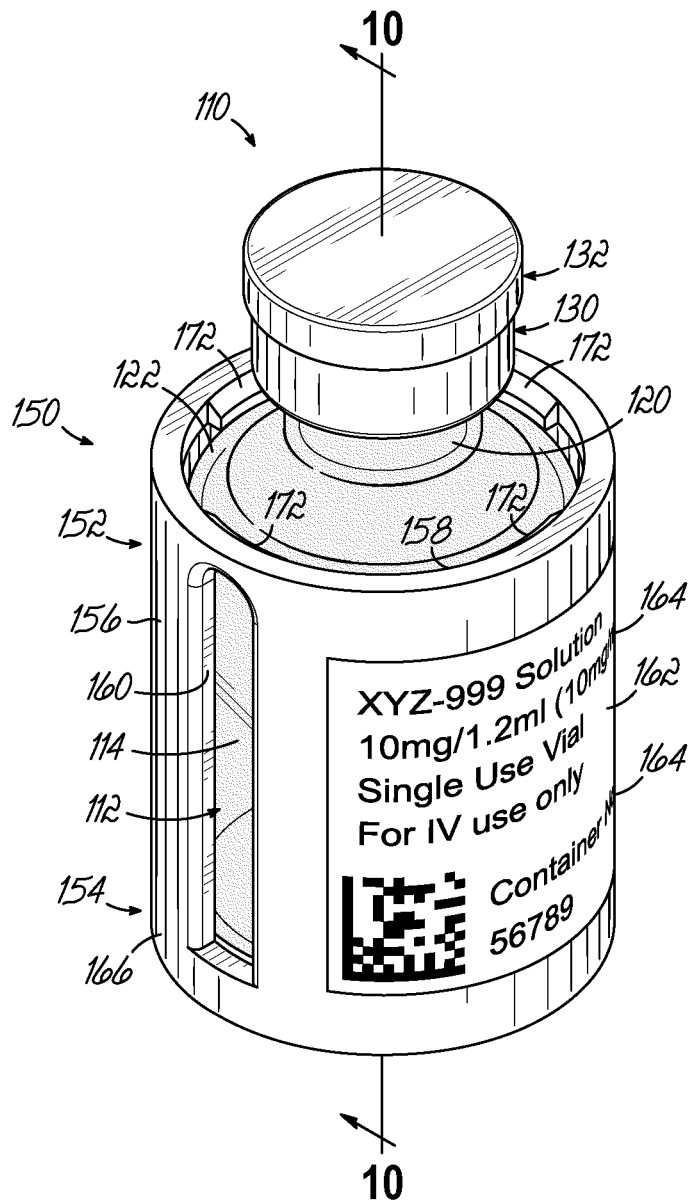
FIG. 9 is a perspective view of the cryogenic vial seated in the vial sleeve of FIG. 8.
Figure 10:
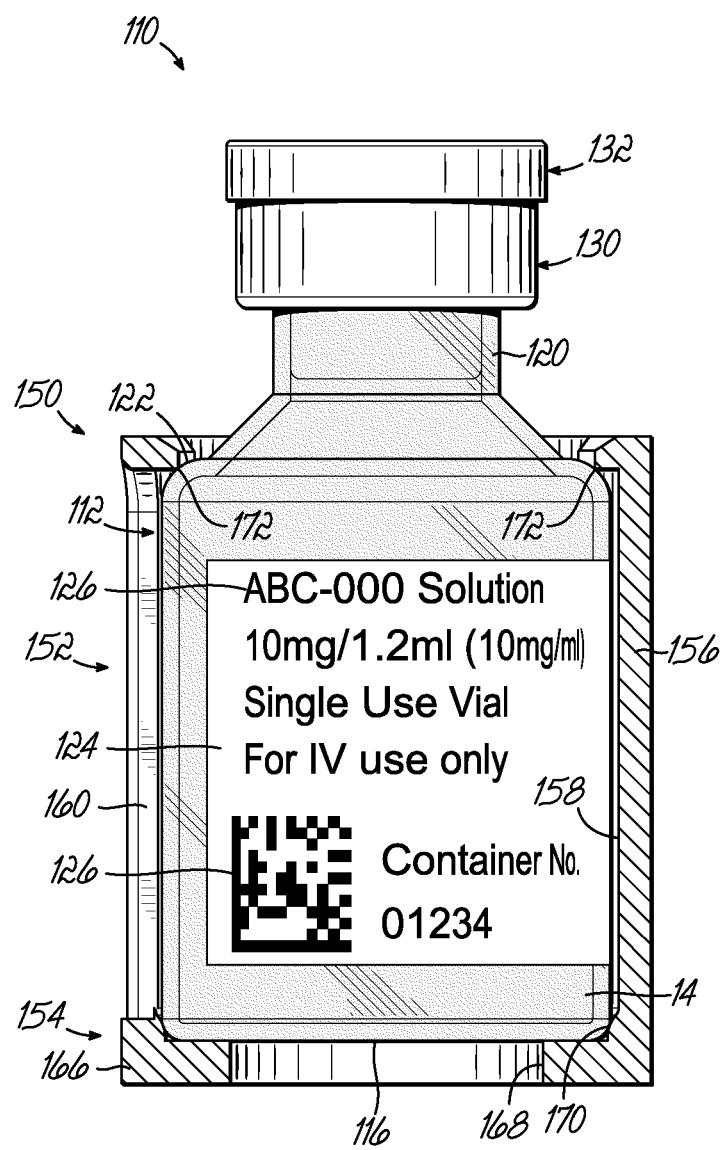
FIG. 10 is a partial cross sectional view of the cryogenic vial seated in the vial sleeve of FIG. 9, taken along section line 10-10.

Referring now to FIGS. 8-10, another exemplary cryogenic vial 110 includes a generally cylindrical body 112 having a side wall 114 and a bottom wall 116, and a generally frustoconical and/or cylindrical neck 120, which collectively define an interior space (not shown) for receiving the contents of the vial 10. As shown, a rounded ledge 122 extends between the side wall 114 and the neck 120.

In the embodiment shown, a first label 124 printed with a first set of indicia 126 is adhered to the exterior surface of the side wall 114 of the cylindrical body 112. As shown, the first label 124 may wrap around a substantial portion of the side wall 114 and may leave an unobstructed longitudinal gap 128 on the exterior surface of the side wall 114 between lateral ends of the first label 124 to avoid interfering with a user's ability to visually assess a fill level of the vial 110 through the transparent material of the cylindrical body 112, for example.

The illustrated cryogenic vial 110 also includes a closure member 130 fixed over the neck 120 for closing off the interior space in a sealed manner and a cap 132 which is removably snap-fit to the closure member 130.

Various other features of the cryogenic vial 110 may be generally similar to those described above with respect to the cryogenic vial 10, and are not repeated for the sake of brevity.

As shown, the vial 110 may be seated in another exemplary vial sleeve 150 according to another embodiment of the present invention, as indicated by the arrow A3 in FIG. 8.

The illustrated vial sleeve 150 includes a generally cylindrical cover portion 152 extending axially away from a generally annular base portion 154. The cylindrical cover portion 152 includes a side wall 156 defining a cavity 158 for receiving the cylindrical body 112 of the vial 110. The cavity 158 of the vial sleeve 150 and the cylindrical body 112 of the vial 110 may be relatively sized to provide a close fit therebetween. For example, the cavity 158 of the vial sleeve 150 and the cylindrical body 112 of the vial 110 may be relatively sized such that the exterior surface of the side wall 114 of the cylindrical body 112 may be slidable along the interior surface of the side wall 156 of the cover portion 152. In any event, the cover portion 152 is constructed of a material capable of withstanding cryogenic temperatures. The cover portion 152 may also be constructed of an opaque material to prevent a user from viewing the exterior surface of the cylindrical body 112 of the vial 10 in the cavity 158 and, more particularly, from viewing the first set of indicia 126 printed on the first label 124 adhered thereto. In one embodiment, the cover portion 152 may be constructed of a plastic polymer such as cyclic olefin co-polymer (COC), for example, and/or of a metal alloy.

The illustrated cover portion 152 includes a cutout or aperture 160 extending longitudinally along the side wall 156. The aperture 160 may overlap the unobstructed longitudinal gap 128 on the exterior surface of the cylindrical body 112 of the vial 10, such that a user may be able to visually assess a fill level of the vial 10 through the aperture 160 and the transparent material of the cylindrical body 112. While the illustrated aperture 160 is closed-ended, the aperture 160 may alternatively be open-ended.

In the embodiment shown, a second label 162 printed with a correct second set of indicia 164 different from the mislabeled first set of indicia 126 is adhered to the exterior surface of the side wall 156 of the cover portion 152. The second set of indicia 164 includes user-discernable text and/or images for visually communicating to a user a certain product or type of product, as well as machine-readable coding such as a QR code for optically communicating similar information to a machine via a reader or scanner. The second label 162 may be adhered to the exterior surface of the side wall 156 with a pressure sensitive adhesive which is allowed to cure at ambient temperature prior to inserting the vial 110 into the sleeve 150 in a cryogenic environment.

The annular base portion 154 of the vial sleeve 150 includes an annular body 166 having a central bore 168. In the embodiment shown, the cover portion 152 and the base portion 154 are integrally formed together as a unitary piece. A lower locking feature is provided at or near the interface between the annular body 166 of the base portion 154 and the side wall 156 of the cover portion 152 including an annular protrusion or raised detent 170 extending radially inwardly from the side wall 156 for frictionally engaging the exterior surface of the cylindrical body 112 of the vial 110. In this regard, the annular detent 170 and the cylindrical body 112 may be relatively sized to provide an interference fit therebetween in order to assist in retaining the vial 110 in the sleeve 150. More particularly, the cylindrical body 112 and the annular detent 170 may interact with each other to resist movement of the vial 110 relative to the sleeve 150 to prevent inadvertent removal of the vial 110 from the sleeve 150. As shown, the annular detent 170 is rounded to assist in advancement of the cylindrical body 112 within the cavity 158 toward the annular body 166. For example, operative engagement of the cylindrical body 112 with the rounded surface of the annular detent 170 as the cylindrical body 112 is advanced toward the annular body 166 may urge the annular detent 170 slightly radially outward to accommodate the cylindrical body 112.

An upper locking feature is provided at or near an upper end of the cover portion 152 including a plurality of arcuate tabs 172 extending radially inwardly from the side wall 156 and opposing the annular base portion 154 for confronting and/or mechanically engaging the rounded ledge 122 of the vial 110 when the cylindrical body 112 is seated in the cavity 158. In this regard, the arcuate tabs 172 and the cylindrical body 112 may be relatively sized to allow at least a portion of each arcuate tab 172 to extend over at least a portion of the rounded ledge 122 and thereby sandwich the cylindrical body 112 between the arcuate tabs 172 and the annular base portion 154 in order to assist in retaining the vial 110 in the sleeve 150. More particularly, the rounded ledge 122 and the arcuate tabs 172 may interact with each other to resist movement of the vial 110 relative to the sleeve 150 to prevent inadvertent removal of the vial 110 from the sleeve 150. As shown, at least the upper surfaces of the arcuate tabs 172 are angled downwardly toward the annular base portion 154 to assist in insertion of the cylindrical body 112 into the cavity 158. For example, operative engagement of the cylindrical body 112 with the downwardly angled upper surfaces of the arcuate tabs 172 as the cylindrical body 112 is inserted into the cavity 158 may urge the arcuate tabs slightly radially outward to allow the cylindrical body 112 to pass therebetween.

In one embodiment, the sleeve 150 may not be readily removable from the vial 110 such that the sleeve 150 may not be removed without substantially damaging the vial 110 and/or the sleeve 150, and thus may be considered irremovable. While the illustrated lower and upper locking features include the annular detent 170 and the arcuate tabs 172, respectively, it will be appreciated that various other locking features capable of interacting with one or more features of the vial 110 to resist movement of the vial 110 relative to the sleeve 150 may be used. For example, a locking feature similar to the semi-annular detents 40 of the base 34 may be used.

Various other features of the vial sleeve 150 may be generally similar to those described above with respect to the vial sleeve 50, and are not repeated for the sake of brevity.

Figure 11:
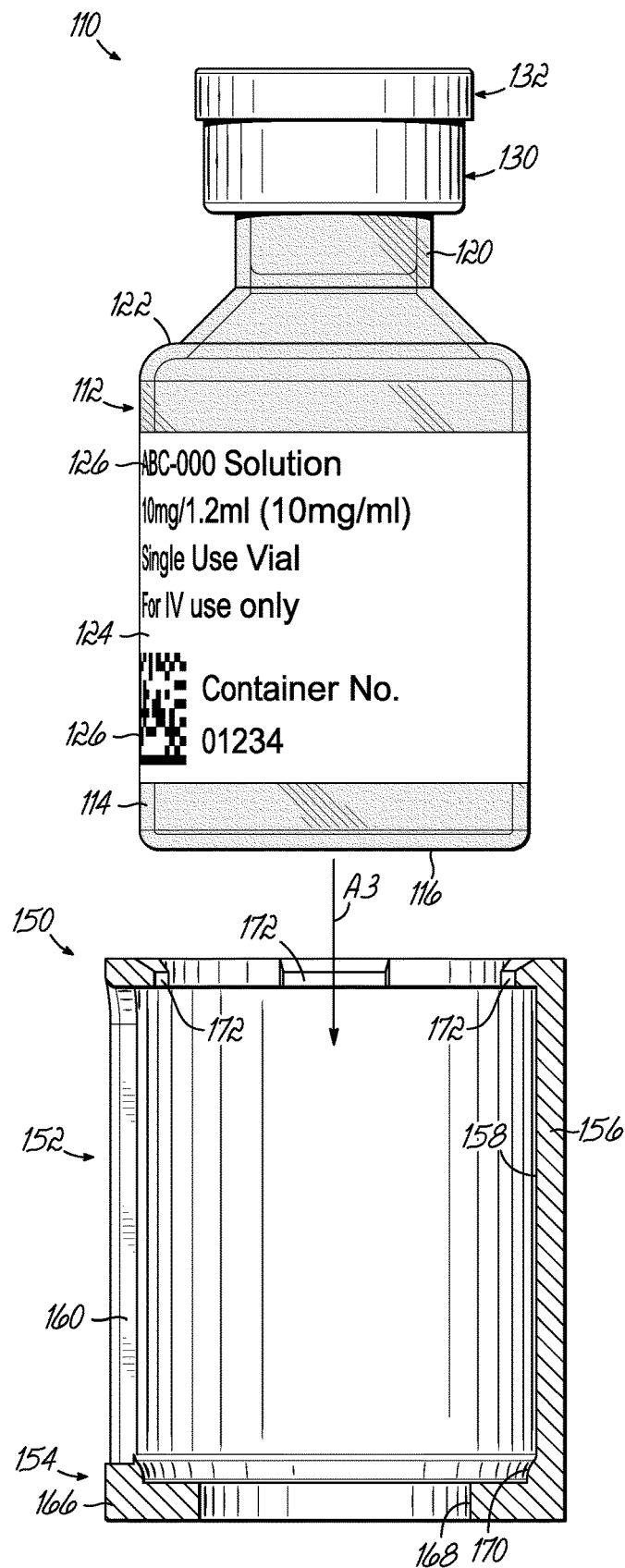
FIG. 11 is a disassembled partial cross sectional view showing the cryogenic vial being inserted into the vial sleeve of FIG. 8.

Referring now to FIG. 11, a method of labeling or relabeling the cryogenic vial 110 includes inserting the vial 110 into the sleeve 150 (with the second label 162 adhered thereto) as indicated by the arrow A3 until the bottom wall 116 of the vial 110 rests on the base portion 154 of the sleeve 150, the cylindrical body 112 of the vial 110 frictionally engages the annular detent 170, and the arcuate tabs 172 confront the rounded ledge 122 to lock the vial 110 in the sleeve 150. The step of inserting the vial 110 into the sleeve 150 may be performed in a cryogenic environment with the vial 110 filled, in order to prevent spoilage of the contents of the vial 110. In one embodiment, this step may be performed in a cryocart. For example, the filled vial 110 may be initially retrieved from a cryogenic freezer and placed in the cryocart. The sleeve 150 may be introduced to the cryocart and allowed to cool to cryogenic temperature. The vial 110 may then be inserted into the sleeve 150 while in the cryocart. The vial 110 seated in the sleeve 150 may then be returned to the cryogenic freezer for continued storage, and may be readily retrieved by a user and/or machine by recognizing the second indicia 164 on the sleeve 150.

Thus, in cases where the first indicia 126 printed on the first label 124 do not properly identify the contents of the vial 110 or are otherwise inaccurate or undesirable, the vial 110 may be readily relabeled with the second indicia 164, which properly identify the contents of the vial 110 and/or provide other desirable information, via the sleeve 150 while the contents of vial 110 remain at a cryogenic temperature necessary to preserve the contents of the vial 110. Alternatively, the sleeve 150 may be used to initially label the vial 110 in cases where the vial 110 has not been previously labeled. In one embodiment, the irremovability of the sleeve 150 from the vial 110 may provide tamper evidence in the event that a user attempts to remove the vial 110 from the sleeve 150.

As described above, the second set of indicia 64, 164 provided on the sleeve 50, 150 may include machine-readable coding such as the illustrated QR codes for optically communicating a certain product or type of product to a machine via a reader or scanner. Alternatively, the machine-readable coding may be provided via any other suitable automatic identification and data capture (AIDC) technique(s). For example, such machine-readable coding may be provided by one or more radio frequency identification (RFID) tags (not shown) located on the sleeve 50, 150.

While the illustrated QR codes are incorporated into the second set of indicia 64, 164 on the second label 62, 162 which is adhered to the exterior surface of the side wall 56, 156 of the sleeve 50, 150, the machine-readable coding may alternatively be provided separately from the second label 62, 162 elsewhere on the sleeve 50, 150. For example, the machine-readable coding may be located on a bottom exterior surface of the sleeve 50, 150, such as on a bottom surface of the annular body 66, 166 of the sleeve 50, 150, in order to be accessible by a reader or scanner from an underside of the sleeve 50, 150. In any event, the machine-readable coding may be read or interpreted by such a reader or scanner manually controlled by a user or automatically controlled by the machine which receives the information from the coding, for example.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A vial sleeve for a cryogenic vial, the cryogenic vial including a body having a side wall and a bottom wall defining an interior space for receiving contents of the vial and an annular projection extending axially away from the bottom wall, the vial sleeve comprising:
   a base portion defining a first surface opposite a second surface and a central bore extending entirely through the base portion from the first surface to the second surface, the central bore defining a first diameter;
   a cover portion extending axially away from the first surface of the base portion, the cover portion including a side wall, the side wall and the first surface defining a cavity, the cavity defining a second diameter, the cavity being configured to receive at least a portion of the body of the vial, the second diameter being greater than the first diameter; and
   a detent extending radially inwardly into the central bore, the detent having a third diameter, the third diameter being less than the second diameter and the first diameter, the detent being axially spaced from the first surface and the second surface, the detent configured to frictionally engage with the annular projection of the vial for resisting axial movement of the vial relative to the vial sleeve, with the frictional engagement of the detent and the annular projection being the only resistance of axial movement of the vial relative to the vial sleeve in an axial direction away from the first surface of the base portion of the vial sleeve.

2. The vial sleeve of claim 1, further comprising:
   a first label adhered to an exterior surface of the side wall of the vial sleeve and including a first set of indicia.

3. The vial sleeve of claim 2, wherein the first set of indicia is different from a second set of indicia included on a second label adhered to an exterior surface of the vial.

4. The vial sleeve of claim 1, further comprising:
   a window formed in the side wall of the cover portion.

5. The vial sleeve of claim 4, wherein the window is configured to overlap an unobstructed longitudinal gap on the vial to provide a visual assessment of a fill level of the vial.

6. The vial sleeve of claim 1, further comprising:
   a machine-readable coding configured to communicate information identifying one or more contents of the cryogenic vial to a machine.

7. The vial sleeve of claim 1, wherein the detent defines a rounded surface extending radially inwardly into the central bore.

8. The vial sleeve of claim 1, wherein the detent is configured to move radially outward in response to engagement with the annular projection of the vial.

9. The vial sleeve of claim 1, wherein the detent defines a plurality of detents extending radially inwardly into the central bore.

10. The vial sleeve of claim 1, wherein the first surface is positioned between the sidewall and the central bore, the detent is partially defined by the first surface and partially defined by the central bore.

11. The vial sleeve of claim 10, wherein the detent defines a rounded surface extending from the first surface radially inwardly into the central bore.

12. A vial sleeve for a cryogenic vial, the cryogenic vial including a body having a side wall and a bottom wall defining an interior space for receiving contents of the vial and an annular projection extending axially away from the bottom wall, the vial sleeve comprising:
a base portion defining a central bore having a first diameter, the central bore configured to receive the annular projection of the vial;
a cover portion extending axially away from the base portion and including a side wall defining a cavity having a second diameter, the cavity configured to receive at least a portion of the body of the vial, the second diameter being greater than the first diameter; and
a detent extending radially inwardly into the central bore, the detent having a third diameter, the third diameter being less than the second diameter and the first diameter, the detent configured to frictionally engage at least a portion of the annular projection of the vial for resisting axial movement of the vial relative to the vial sleeve, with the frictional engagement of the detent and the annular projection being the only resistance of axial movement of the vial relative to the vial sleeve in an axial direction away from the base portion of the vial sleeve.

13. The vial sleeve of claim 12, further comprising:
a first label adhered to an exterior surface of the side wall of the vial sleeve and including a first set of indicia.

14. The vial sleeve of claim 13, wherein the cryogenic vial further includes a second label adhered to an exterior surface of the vial and including a second set of indicia different from the first set of indicia.

15. The vial sleeve of claim 12, further comprising:
a window formed in the side wall of the cover portion.

16. The vial sleeve of claim 12, wherein the vial sleeve further includes a machine-readable coding configured to communicate information identifying one or more contents of the cryogenic vial to a machine.

17. The vial sleeve of claim 12, wherein the detent defines a rounded surface extending radially inwardly into the central bore.

18. The vial sleeve of claim 12, wherein the detent is configured to move radially outward in response to engagement with the annular projection of the vial.

19. The vial sleeve of claim 12, wherein the base portion defines a ledge positioned between the sidewall and the central bore, wherein the detent defines a rounded surface extending from the ledge radially inwardly into the central bore.

20. A vial sleeve for a cryogenic vial, the cryogenic vial including a body having a bottom wall, a side wall, and a neck that collectively define an interior space configured to receive contents of the vial, a ledge is positioned between the neck and the side wall, the vial sleeve comprising:
a base portion;
a cover portion extending axially away from the base portion and including a side wall defining a cavity, the cavity configured to receive at least a portion of the body of the vial;
an annular detent extending radially inwardly from the side wall into the cavity, the annular detent formed partially by the side wall and partially by the base portion;
at least one arcuate tab extending radially inwardly from the side wall into the cavity,
the annular detent configured to frictionally engage at least a portion of the vial body; and
the at least one arcuate tab configured to extend over at least a portion of the ledge of the vial such that the at least one arcuate tab sandwiches the body of the vial between the at least one arcuate tab and the annular detent to resist axial movement of the vial away from the base portion of the vial sleeve.

21. The vial sleeve of claim 20, wherein an exterior portion of at least a portion of the body of the vial is slidable along the side wall of the cover portion.

22. The vial sleeve of claim 20, wherein the cover portion is comprised of an opaque material.

23. The vial sleeve of claim 20, wherein the cover portion further comprises an aperture extending along the side wall.

24. The vial sleeve of claim 20 wherein the base portion is integrally formed with the cover portion.

25. The vial sleeve of claim 20, wherein the frictional engagement between the annular detent and at least a portion of the vial body comprises an interference fit.

26. The vial sleeve of claim 20, wherein the annular detent comprises a rounded surface.

27. The vial sleeve of claim 20, wherein the at least one arcuate tab comprises an upper surface angled downwardly towards the base portion.

28. The vial sleeve of claim 20, wherein the at least one arcuate tab is configured to move radially outward upon engagement with at least a portion of the vial body.

* * * * *